3,335,106
FLUORINATED ELASTOMERIC TERPOLYMERS
AND PROCESS FOR THEIR PREPARATION
Dario Sianesi, Gian Carlo Bernardi, and Gianfranco Diotallevi, Milan, Italy, assignors to Montecatini Edison S.p.A., Milan, Italy, a corporation of Italy
No Drawing. Filed July 29, 1965, Ser. No. 475,843
Claims priority, application Italy, July 31, 1964,
16,845/64
12 Claims. (Cl. 260—29.6)

The present invention relates to a new class of elastomeric copolymers of fluorinated monomers, and to a process for their preparation.

As is known, modern technology requires both thermoplastic and elastomeric copolymers possessing high chemical and heat stability along with good mechanical characteristics, and which can be easily worked and shaped into a variety of useful articles.

Certain fluorine-containing polymers are known and are regarded as possessing the above mentioned characteristics to a high degree. It can be considered, as a general rule, that the higher the fluorine content in these polymers, the higher is their resistance to heat, strong chemicals and solvents.

However, it is to be noted that, in partially fluorinated polymers, that is polymers which contain atoms of other elements besides carbon and fluorine, it is not merely the numerical value of the combined fluorine content that has a major influence on the stability properties of the polymer. In most cases, in fact, and particularly in the case of fluorinated polymers which also contain carbon to hydrogen bonds, the type of distribution and position with respect to each other of the different carbon to fluorine and carbon to hydrogen bonds in the macromolecules plays a determinant role as far as the stability of the product is concerned.

We have observed that 1H-pentafluoropropene

$$CFH=CF-CF_3$$

is a highly interesting olefin in this respect because, though not completely fluorinated by copolymerization with other fluorinated monomers, it can supply polymers, which along with a combination of very good physico-chemical properties, can also have very high heat and chemical resistance.

Earlier, we disclosed copolymers of 1H-pentafluoropropene and tetrafluoroethylene showing essentially thermoplastic characteristics and exceptional heat and chemical resistance. We have also disclosed copolymers of 1H-pentafluoropropene and vinylidene fluoride showing high stability characteristics and very good elastic properties within a wide range of temperatures.

By a comparison of the properties of the two different copolymers aforementioned, we have established that the structure of the olefin used as comonomer with 1H-pentafluoropropene plays a determinant role as far as the physico-mechanical properties of the resulting polymer are concerned. In one case, the polymerizate consisted of a thermoplastic solid, high melting point product, which was insoluble in all the most common organic solvents; in the other, it consisted of an amorphous product having low torsional modulus and high elastic characteristics, which was soluble in some organic solvents.

The comparison showed that the thermoplastic copolymer of 1H-pentafluoropropene with tetrafluoroethylene had much more pronounced resistance to heat, solvents and chemicals than the elastomeric copolymer of pentafluoropropene with vinylidene fluoride which is only a partially fluorinated olefin.

We were convinced, on the basis of said comparison, and the conviction appeared to be valid, that copolymers having excellent elastic characteristics could be obtained from 1H-pentafluoropropene only by using a partially fluorinated olefin as comonomer and thus renouncing the exceptional stability properties imparted by the presence of totally fluorinated units incorporated in the macromolecular chain.

Surprisingly, we have found that under certain conditions, which will be specified in detail below, it is possible to obtain products having the combination of both excellent heat and chemical stability and excellent elastic characteristics which persist over a wide temperature range.

It is a primary object of our invention to provide such new products having said combination of properties.

This and other objects are accomplished by our invention which provides a new class of terpolymers containing units of tetrafluoroethylene, 1H-pentafluoropropene and vinylidene fluoride.

The terpolymers of our invention have a high fluorine content, very good elastomeric properties, can be vulcanized and shaped into a variety of manufactured useful articles and exhibit very marked resistance to damage at high temperatures, strong chemicals, and solvents.

The marcromolecules of the terpolymers of this invention contain from a minimum of 2% up to about 50% by weight of units deriving from tetrafluoroethylene and from about 15% to 50% of units derived from 1H-pentafluoropropene, the remaining units making up the macromolecular main chain being units deriving from vinylidene fluoride. Units of all three starting monomers are present in the macromolecules of the terpolymers and the latter must contain not less than about 20% by weight of vinylidene fluoride.

We have established that while even 2% by weight of combined tetrafluoroethylene results in an appreciable increase in the thermal and chemical stability of the products, amounts of tetrafluoroethylene below 2% by weight have no noticeable effect on either the heat or the solvent stability of the products.

On the other hand, when the amount of combined tetrafluoroethylene exceeds about 45% by weight, the elastomeric properties of the terpolymer begin to disappear, with the terpolymer becoming increasingly of the thermoplastic type. At combined tetrafluoroethylene contents in excess of 50% by weight, the terpolymers are thermoplastic and no longer exhibit the properties of an elastomer.

When the amount of tetrafluoroethylene combined in the terpolymer is comprised within the aforementioned limits, and the ratio by weight between the combined units of 1H-pentafluoropropene and vinylidene fluoride in the copolymer is from 0.2 to 2.5, the terpolymerizates possess exceptionally good elastic properties combined with a chemical and heat stability which is remarkably improved as compared to that of the two-component copolymers of vinylidene fluoride and 1H-pentafluoropropene and which do not contain any tetrafluoroethylene units.

The elastomeric terpolymerizates of this invention, therefore, contain from 2 to 45%, preferably 4 to 35%, by weight of units resulting from the polymerization of tetrafluoroethylene, the remainder of the units making up the terpolymer macromolecules consisting of units resulting from the polymerization of 1H-pentafluoropropene and units resulting from the polymerization of vinylidene fluoride, the last-mentioned units being present in the terpolymerizate in a proportion not less than 20% by weight and the ratio by weight between the combined units deriving, respectively, from 1H-pentafluoropropene and vinylidene fluoride being from 0.2 to 2.5, preferably from 0.4 to 2.

The terpolymerizates are obtained by subjecting a mixture of the three monomers to polymerizing conditions. Suitable monomer mixtures contain, by weight, from 1 to 45, parts of tetrafluoroethylene, from 15 to 70 parts by weight of 1H-pentafluoropropene, and from 15 to 85 parts of vinylidene fluoride.

As is known, when a mixture of two or more monomers is polymerized, the resulting polymerizates do not always have a composition such that the relative proportions of the respective monomers therein is the same as it was in the starting monomer mixture. This results from the fact that the composition of the polymerized product depends on the reactivities of the individual monomers in the starting mixture, under the given polymerization conditions, on the conversion degree to be reached, etc. By observing particular criteria, however, and making suitable adjustments taking account of the different reactivity rates of the respective starting monomers, polymerizates of the desired composition can be obtained from starting monomer mixtures of appropriate composition.

The present terpolymerizates are obtained by subjecting a starting monomer mixture of the aforesaid composition to polymerizing conditions in contact with a polymerization initiator which yields free radicals under the terpolymerization conditions employed.

Any polymerization initiator can be used, and is selected for a particular run, in dependence on the temperature and other conditions of the terpolymerization, and so that under the conditions used, it does release free radicals which initiate and promote the terpolymerization reaction.

Suitable initiators can be halogen-containing or halogen-free organic peroxides or hydroperoxides, such as, for example, dialkyl or diacyl peroxides, peroxides of acids, esters and ketones. Typical initiators of this type and all of which are useful in the practice of this invention are benzoyl, p-chlorobenzoyl, 2,4-dichlorobenzoyl, acetyl and lauroyl peroxides, succinic acid peroxide, t-butyl perbenzoate, t-butyl hydroperoxide, cumene hydroperoxide, cyclohexanone peroxides and hydroperoxides, trichloroacetyl, perfluoropropionyl, and heptafluorobutyril peroxides, etc.

Known polymerization initiators of the type of alpha-alpha'-azodiisobutyronitrile, alpha-alpha'-azodiethylnitrile, and similar substances are also useful in the practice of our invention.

Inorganic peroxy compounds such as persulphates, perphosphates, perborates and percarbonates of sodium, potassium, ammonium, calcium, barium, etc., hydrogen peroxide, sodium or barium peroxide, etc. may also be used.

The amount of the initiators used is from 0.001 to 5.0, preferably from 0.01 to 3.0 parts by weight per 100 parts by weight of the mixture of starting monomers to be terpolymerized.

The terpolymerization can be carried out by bulk, suspension, emulsion, or solution procedures. If solution terpolymerization is employed, the solvents may be hydrocarbon solvents, oxygenated solvents such as, for example, alcohols, esters, ethers and ketones. However, the presently preferred solvents are halogenated or perhalogenated organic compounds which are liquid under the terpolymerization conditions. Examples of such preferred solvents are, for instance, halogenated methane or ethane derivatives such as methylene chloride, fluorotrichloromethane, dichlorodifluoromethane, dichlorotetrafluoroethane, perfluorocyclobutane, perfluorodimethylcyclobutane, perfluorocyclohexane, perfluorokerosene, perfluoropropylpyrane, etc.

The liquid reaction medium may also be one or more of the monomers to be terpolymerized.

In the presently preferred embodiment of the invention, the terpolymerization is carried out in an aqueous medium, using, preferably in this case, initiators which are water-soluble organic, or even more preferably, inorganic peroxy compounds. In such preferred embodiment, also there is contemplated by us the use of substances which function as polymerization activators, such as salts of metals in different valency states, including iron, copper, silver, titanium sulphates, nitrates, phosphates and chlorides, and so on.

The addition of accelerants such as sodium bisulphite, metabisulphite, thiosulphate, reducing sugars, etc., to the terpolymerization system is also within the scope of this invention.

Activators and/or accelerants are generally used in amounts ranging from 0.001% to 5% by weight, based on the weight of the monomers charged to the reactor.

It is also possible to include buffering agents in the reaction mass, in order to maintain the pH of the aqueous phase constant during the terpolymerization. Suitable buffering agents include sodium borate, monosodium or bisodium phosphate, etc.

In carrying out the terpolymerization in aqueous phase, it can be useful to include emulsifying agents such as alkaline or ammonium salts of higher fatty acids or, and preferably, alkaline or ammonium salts of perfluorinated long-chain acids or of $\omega$-hydro or $\omega$-chloroperfluorinated acids of the general formula $X(CF_2-CF_2)_n\text{-COOH}$, wherein X is H or Cl and $n$ is an integer from 2 to 6, inclusive.

The terpolymerization can be carried out either continuously or discontinuously under pressures varying from 1 atm. to 200 atm. and at temperatures between 0° C. and 150° C.

When the terpolymerization is conducted in aqueous phase, the preferred reaction temperature is from 20° C. to 110° C., and the pressure is from 2 to 100 atm.

The terpolymerizates of the invention have, in general, a high molecular weight, normally higher than 20,000, determined by viscosity measurement. If terpolymerizates of lower molecular weight are preferred, suitable chain transfer agents can be included in the reaction mass, such as, for instance, lauryl mercaptan, chloroform, carbon tetrachloride, methanol, etc.

The amount of such agents used depends on the extent to which the molecular weight is to be controlled and regulated so that it will be below the molecular weight of 20,000 or higher normally had by the terpolymerizates. In general, the transfer agents are used in an amount of from 0.001% to 10% by weight, preferably between 0.01% and 2% by weight, on the total weight of the monomers.

According to a preferred method of producing the terpolymerizates, and which results in terpolymerizates having a limited and controlled molecular weight distribution, comprises introducing the mixture of the three monomers, tetrafluoroethylene, 1H-pentafluoropropene and vinylidene fluoride, in relative proportions to result in a terpolymerizate of the desired composition and as disclosed hereinabove, into an autoclave constructed of a material resistant to deterioration by the reagents used, and then, as the monomers are consumed in the terpolymerization, continuously feeding into the autoclave a mixture of the monomers in relative proportions such as to result in a terpolymerizate of the desired overall composition and maintain the pressure in the reactor constant throughout the course of the reaction.

In carrying out the terpolymerization according to said preferred embodiment, it is also possible to achieve the same final result, by continuously injecting into the autoclave an aqueous solution containing the initiator and monomers, while continuously discharging from the autoclave, an equivalent volume of the aqueous dispersion of the terpolymerizate formed.

The terpolymerizate can be separated readily from the aqueous dispersion by coagulation, as by heating, freezing, water evaporation, or by the addition of coagulating aids, such as acid or salt solution, to the dispersion.

The terpolymerizates having the composition set forth herein have the appearance of unvulcanized rubbers, are normally amorphous, and are characterized by a low torsional modulus. In general, the terpolymerizates are soluble in such solvents as ketones, e.g., acetone, butanone, cyclohexanone; esters such as methyl, ethyl and propyl formates, acetates, propionates, butyrates, etc.; formamide; dimethylformamide, etc.

The infra-red spectra of the terpolymerizates show various absorption bands indicating the presence of polymerized units of the different monomers in the macromolecules. The intensity of such absorption bands is directly related to the proportion of the single structural units of each of the respective monomers which is present in the macromolecules.

Thus, absorption bands characteristic of, and due to the presence of, vinylidene fluoride in the terpolymerizates are found, in the IR spectra, in the area of 6.95 microns, 7.15 microns, and 11.40 microns; bands characteristic of, and due to the presence of, tetrafluoroethylene are found, in the IR spectra, in the area of 10.0 microns, 10.75 microns, and 12.15 microns; and bands characteristic of, and due to the presence of, units of polymerized 1H-pentafluoropropene are found in the area 7.50 microns and 7.80 microns.

The terpolymerizates can be easily worked up on the devices used conventionally for the working up of rubbers, and can be cured to elastomers having very good mechanical properties and the high thermal and chemical stability which has been discussed herein.

The curing treatments which are likely to bring about cross-linking of the terpolymerizate molecules appreciably enhance the mechanical resistance and rebound properties of the cured products.

Polyfunctional organic bases, such as hexamethylenediamine or hexamethylenediamine carbamate, N,N'-bis-cinnamyliden-hexamethylenediamine, diethylene-triamine, cycloalkyl diamines, are particularly effective curing agents for these terpolymerizates.

Peroxy organic compounds, such as benzoyl peroxide, ionizing radiations, high energy electrons, or beta or gamma rays can also be used as curing agents.

Prior to the vulcanization, and additional to the vulcanizing agents, there can be mixed with the terpolymerizates, various other substances which function as vulcanization accelerants, acid acceptors, reinforcing fillers, pigments, plasticizing agents, etc., by usual mixing means.

One convenient process for curing the terpolymerizates comprises mixing 100 parts of the terpolymerizate with 10–20 parts magnesium oxide, 20–40 parts of carbon black and 1–3 parts of one of the above mentioned diamines or their derivatives in a conventional roll mixer at room temperature.

The mass is then shaped by pressing at 120°–160° C. while maintaining it in the mould at said temperature for, e.g., 30 minutes. The article thus shaped is then kept at about 200° C. for a period of 10–24 hours to complete the vulcanization.

The terpolymers of the present invention, vulcanized as above show excellent mechanical properties over a wide temperature range and such high thermal and dimensional stability as to withstand temperatures even above 250° C. for periods of the order of hundreds of hours, with no appreciable variations in their properties.

Furthermore, they possess a high resistance to strong chemicals, e.g., mineral acids or bases and insolubility in a variety of organic solvents and liquids, such as, e.g., aliphatic, aromatic hydrocarbons, fuel and lubricating oils, chlorinated compounds of methane, ethylene, ethane, etc.

The terpolymers are particularly useful in the manufacture of films, sheets, tapes, fibres and articles of various shapes and dimensions.

The terpolymers can also be applied, in usual ways, as coatings on surfaces of various materials or by impregnation, using either suspensions, aqueous emulsions or latexes, or solutions in suitable solvents, e.g., aliphatic ketones such as acetone, butanone, cyclohexanone, esters, such as formates, butyrates, acetates, propionates, etc. of lower alcohols.

Particularly in the form of vulcanized elastomers, the products of the invention are especially useful for the production of flexible tubes, gaskets for flanges, seals; gaskets for connectors, containers, etc., whenever resistance to high temperatures, to wear, and to attack by strong solvents or chemicals are required.

The following examples are given to illustrate the invention, and are not intended to be limiting.

EXAMPLE 1

In a 2,500 cc. autoclave lined with stainless steel and provided with an anchor stirrer, heating jacket, thermometer and manometer and suitable devices for feeding and discharging reactants and products, a vacuum of 1 mm. Hg is produced. Then nitrogen is introduced up to atmospheric pressure and vacuum produced again. Then 1,200 ml. of carefully de-aerated water, containing 7.8 g. of $Na_2HPO_4.12H_2O$ in solution are introduced by suction into the autoclave.

The autoclave is heated to 80° C. and 200 ml. air-free water containing 4.4 g. of $(NH_4)_2S_2O_8$ in solution are added by suction. A gaseous mixture of 19.5% by volume $C_2F_4$, 22.1% by volume 1H-pentafluoropropene and 58.4% by volume of vinylidene fluoride is then introduced by means of a compressor, up to a pressure of 15 atm.

As the polymerization proceeds, the gaseous mixture is fed into the autoclave by means of a compressor and at a rate such that a constant pressure of 15 atm. is maintained in the autoclave; thirty minutes after the first addition of the monomer mixture, the aqueous dispersion is discharged through a suitable valve in the bottom of the autoclave.

At the same time, by means of a pump for liquids, air-free water containing 5.58 g./l. of $Na_2HPO_4.12H_2O$ and 3.15 g./l. of $(NH_4)_2S_2O_8$ in solution is fed into the autoclave in an amount equivalent to the quantity of water discharged with terpolymerizate formed. Said aqueous solution is added at a rate of 5 l./h.

After an 8-hour reaction time, feeding of the monomers is stopped and the polymer aqueous dispersion is completely discharged from the autoclave. The terpolymerizate is precipitated from the aqueous dispersion by adding an equal volume of NaCl saturated aqueous solution to the dispersion, under vigorous stirring.

The terpolymerizate thus precipitated is washed with running water, dried in an oven at 100° C. in an air stream, and then homogenized on a roll mixer.

There are thus obtained 8.680 kg. of a white terpolymerizate having the appearance and properties of an unvulcanized rubber.

The data obtained from elemental analysis of said terpolymer are the following: C=30.98% by weight; F=67.40% by weight; H=1.62% by weight.

In the infrared absorption spectrum of the terpolymerizate characteristic bands are observed in the areas of 3.30; 6.95 microns, 7.15 microns, 7.50 microns, 7.80 microns, 10.00 microns, 10.75 microns, 11.40 microns, and 12.15 microns.

The intrinsic viscosity measured in methylethylketone at 30° C. is equal to 1.06 (.100 ml./g.).

100 g. of said terpolymerizate are mixed in a roll mixer, with 3 g. of N,N'-bis-cinnamyliden-hexamethylenediamine, 15 g. of MgO and 20 g. carbon black. Portions of said mix are molded into approx. 1 mm. thick sheets by pressing in a mold at 150° C. under a load of approx. 50 kg./cm.$^2$.

After 30 minutes, the sheets are drawn out of the mold and placed in circulating-air oven at 200° C. for 20 hours, reaching said temperature in four hours.

Specimens of the type described in ASTM D 412 D are prepared from the sheets obtained.

Traction tests on said specimens, carried out at a traction rate of 50 mm./minute, give the following characteristics:

Tensile strength _____ 221 kg./cm.$^2$.
Elongation at break_____ 360%.
Modulus at 100% _____ 36 kg./cm.$^2$.
Modulus at 200% _____ 90 kg./cm.$^2$.
Residual set _____ 16.5% 10 minutes after break.

1 mm. thick specimens of the same vulcanized product, obtained as described above, are kept in a circulating-air oven at 260° C. for 120 hours after which the specimens show the following characteristics:

Tensile strength _____ 186 kg./cm.$^2$.
Elongation at break _____ 345%.
Modulus at 100% _____ 36 kg./cm.$^2$.
Modulus at 200% _____ 69 kg./cm.$^2$.
Residual set _____ 20% 10 mins. after break.

1 mm. thick specimens of the same vulcanized product as described above are kept immersed, at 30° C., and for 240 hours, in different solvents or chemical agents. The samples are thereafter dried, washed, dried in an oven under vacuum, weighed and the dynamometric properties are determined, with results as reported in Table 1.

TABLE 1

| Solvent or agent | Variation in weight, percent | Variation tensile strength, percent | Variation elongation at break, percent |
|---|---|---|---|
| Acetone | −3.8 | −5 | +12 |
| Ethylacetate | −3.2 | −3 | +15 |
| N. heptane | 0.0 | −1 | −3 |
| Toluene | +1.1 | −4 | +2 |
| 98% H$_2$SO$_4$ | +2.2 | +13 | −10 |
| 65% HNO$_3$ | +4.7 | +5 | −13 |
| 10% aqueous NaOH | −0.1 | +3 | −1 |

EXAMPLE 2

Into the autoclave used in Example 1, in which air has been completely substituted with nitrogen and a vacuum of 1 mm. Hg produced, 1,400 ml. of air-free water containing 8.80 g. of (NH$_4$)$_2$S$_2$O$_8$ and 7.80 g. Na$_2$HPO$_4$.12H$_2$O in solution are introduced.

The autoclave is brought to 80° C. and the monomer mixture consisting of 10% mols of tetrafluoroethylene, 23% mols of 1H-pentafluoropropene, and 67% mols of vinylidene fluoride is introduced up to a pressure of 10 atm. The pressure is kept constant throughout the course of the polymerization by feeding a monomer mixture of the stated composition into the autoclave as the polymerization proceeds.

After 65 minutes, the autoclave is cooled, the residual gases are released and the polymer dispersion is coagulated as described in Example 1. After washing and drying, there is obtained a terpolymerizate which weighs 720 g., is white, and has the characteristics of unvulcanized rubber.

Centesimal analysis shows that the terpolymerizate is made up of copolymerized units of tetrafluoroethylene, vinylidene fluoride and 1H-pentafluoropropene with molar ratios of 1:7:2. The weight composition of the terpolymerizate is as follows: tetrafluoroethylene 12.3%, vinylidene fluoride 55.1%, pentafluoropropylene 32.6%.

The intrinsic viscosity of the terpolymerizate in methylethylketone at 30° C., is found to be 0.70 (.100 ml./g.).

The terpolymerizate, vulcanized as described in Example 1, shows the following dynamometric characteristics:

Tensile strength_____ 208 kg./cm.$^2$.
Elongation at break_____ 335%.
Modulus at 100%_____ 36 kg./cm.$^2$.
Modulus at 200%_____ 103 kg./cm.$^2$.
Residual set_____13% 10 mins. after break.

EXAMPLE 3

Into the autoclave used in Example 1, from which air has been eliminated by washing with nitrogen and vacuum produced, 1,400 ml. of air-free water containing 2.20 g. of K$_2$S$_2$O$_8$ and 7.80 g. of Na$_2$HPO$_4$.12H$_2$O in solution are introduced.

The autoclave is heated to 95° C. and a monomer mixture consisting of 35% by mols tetrafluoroethylene, 28% by mols 1H-pentafluoropropene, and 37% mols of vinylidene fluoride is introduced by means of a compressor up to a pressure of 40 atm., which is maintained throughout the polymerization reaction by feeding of monomer mixture of the stated composition into the autoclave.

After 47 minutes, the autoclave is cooled, the residual gases are discharged and the terpolymerizate is isolated as described in the preceding example; it weighs 813 g.

The terpolymerizate thus obtained is white and has the characteristics of unvulcanized rubber. By centesimal analysis it is found to have an average composition of 36% mols of units deriving from tetrafluoroethylene, 24% mols of units deriving from 1H-pentafluoropropene and 40% mols of units deriving from vinylidene fluoride.

The weight composition is the following: tetrafluoroethylene 38.6%, vinylidene fluoride 27.4%, pentafluoropropylene 34%.

The intrinsic viscosity of this terpolymerizate, in methylethylketone at 30° C., is 0.96 (.100 ml./g.).

After vulcanization as described in Example 1, the product shows the following dynamometric characteristics:

Tensile strength_____ 241 kg./cm.$^2$.
Elongation at break_____ 316%.
Modulus at 100%_____ 61 kg./cm.$^2$.
Modulus at 200%_____ 163 kg./cm.$^2$.
Residual set_____ 16.5% 10 mins. after break.

EXAMPLE 4

Into an autoclave of 200 cc. capacity, there are introduced 0.034 g. of (NH$_4$)$_2$S$_2$O$_8$, 0.018 g. of Na$_2$S$_2$O$_5$, and 0.300 g. of ammonium perfluorooctanoate.

A vacuum of 1 mm. Hg is produced in the autoclave and 100 ml. of air-free H$_2$O are introduced by suction.

The autoclave is immersed in a freezing bath at −78° C. and vacuum is produced again in the autoclave, after which 15.00 g. of tetrafluoroethylene, 11.98 g. of 1H-pentafluoropropene and 23.02 g. vinylidene fluoride are introduced by vacuum distillation.

The autoclave is then placed in an oil bath at 50° C., and agitated for 16 hours, at the end of which time the polymerization is quantitative, there being no unreacted monomers present.

The autoclave is opened, and a very stable aqueous dispersion of the polymer is taken out, from which, after addition of 20 ml. of concentrated aqueous HCl, the solid polymer is separated under stirring. It is repeatedly washed and dried in a circulating air oven at 100° C. The terpolymerizate thus obtained is white, has the appearance of an unvulcanized rubber and has an intrinsic viscosity in methylethylketone at 30° C. of 2.19 (.100 ml./g.).

The terpolymerizate, after vulcanization as described in Example 1, showed the following dynamometric characteristics under traction.

Tensile strength_____ 260 kg./cm.$^2$.
Elongation at break_____ 310%.
Modulus at 100%_____ 65 kg./cm.$^2$.
Modulus at 200%_____ 170 kg./cm.$^2$
Residual set_____ 20% 10 mins. after break.

EXAMPLE 5

Into the autoclave used in Example 4, cooled to −78° C., there are introduced 6 g. perfluorobutyric anhydride and 0.3 g. of 35% H$_2$O$_2$.

The autoclave is closed and 60 g. of perfluorocyclobutane, 3.0 g. of tetrafluoroethylene, 30.0 g. of 1H-pentafluoropropene and 30.0 g. of vinylidene fluoride are introduced.

The autoclave is kept under alternating (rocking) agitation for 16 hours in an oil bath at 50° C. The residual gases are then discharged, and 2.5 g. of a terpolymerizate showing characteristics of unvulcanized rubber are recovered.

The terpolymerizate has an intrinsic viscosity of 0.5 (.100 ml./g.), in methylethylketone at 30° C.

EXAMPLE 6

Into the autoclave used in carrying out Example 4, 0.200 g. of benzoylperoxide are introduced. The autoclave is cooled to −78° C. and evacuated, and 39.6 g. of 1H-pentafluoropropene, 12.8 g. of vinylidene fluoride and 10.0 g. of tetrafluoroethylene are added by vacuum distillation. The autoclave is then kept under alternating agitation in an oil bath at 90° C. for 16 hours, after which the residual gases are discharged and 1.8 g. of a terpolymerizate having the characteristics of an unvulcanized rubber are recovered.

By repeating the polymerization under the same conditions and with the same amounts of reactants, with the exception that 0.200 g. of alpha-alpha'-azo-bis isobutyronitrile is used instead of benzoylperoxide, 1.6 g. of a terpolymerizate having the characteristics of an unvulcanized rubber are recovered.

The IR spectra of the two terpolymerizates obtained as described in this example, show absorption bands due to the presence in the terpolymerizate of units of all three of the starting monomers, linked in the chain.

EXAMPLE 7

Into the autoclave used in Example 4, kept at the temperature of −78° C., there are introduced, in the following order: 0.017 g. of $FeSO_4 \cdot 7H_2O$ dissolved in 50 ml. of water; 0.034 g. of $(NH_4)_2S_2O_8$ dissolved in 50 ml. of water; and 0.5 ml. of methanol.

The autoclave is closed and evacuated, and 32 g. of an equimolar mixture of tetrafluoroethylene, 1H-pentafluoropropene and vinylidene fluoride are added by vacuum distillation.

The polymerization is carried out at a temperature of 25–30° C. for 16 hours. Following the procedure described in the foregoing examples, there are obtained 12.5 g. of a terpolymerizate having the appearance of an unvulcanized rubber and an intrinsic viscosity of 0.42 (.100 ml./g.) in methylethylketone at 30° C.

As will be apparent, various changes and modifications can be made in details in carrying out the invention without departing from the spirit thereof. Therefore, it is intended to include in the scope of the appended claims all such modifications and variations as will be obvious to those skilled in the art from the description and illustrative working examples given herein.

What is claimed is:

1. Fluorinated, elastomeric terpolymerizates characterized in consisting of macromolecules made up of polymerized units of 20–83% vinylidene fluoride, 15–50% 1H-pentafluoropropene and 2–50% tetrafluoroethylene.

2. Terpolymerizates according to claim 1, further characterized in consisting of macromolecules containing from 2 to 45% by weight of polymerized units of tetrafluoroethylene, the remaining units making up the macromolecules being polymerized units of 1H-pentafluoropropene and polymerized units of vinylidene fluoride, the polymerized units of vinylidene fluoride being present in an amount of at least 20% by weight, and the weight ratio of the combined polymerized units of 1H-pentafluoropropene and of vinylidene fluoride being from 0.2 to 2.5.

3. Terpolymerizates according to claim 1, further characterized in that the weight ratio of the combined polymerized units of 1H-pentafluoropropene and of vinylidene fluoride is from 0.4 to 2.0.

4. Terpolymerizates according to claim 2, vulcanized to elastomeric materials.

5. Manufactured shaped articles of the vulcanized elastomeric materials of claim 4.

6. Compositions selected from the group consisting of latexes, dispersions and solutions of terpolymerizates according to claim 1.

7. The process for producing fluorinated, elastomeric terpolymerizates according to claim 1, characterized in that a mixture of, by weight, from 1 to 45 parts of tetrafluoroethylene, from 15 to 70 parts of 1H-pentafluoropropene, and from 15 to 85 parts of vinylidene fluoride is polymerized at a temperature of from 0° C. to 150° C., under a pressure of from 1 atm. to 200 atm., in contact with a polymerization initiator which yields free radicals at said polymerization temperatures and pressures.

8. The process according to claim 7, further characterized in that the polymerization is carried out in an aqueous phase containing water soluble, inorganic peroxy compounds, at temperatures ranging from 20 to 110° C. and under pressures between 2 and 100 atms.

9. The process according to claim 7, further characterized in that the initiator is used in an amount of from about 0.001 to about 5 parts by weight per 100 parts by weight of the reacting monomer mixture.

10. The process according to claim 7, further characterized in that the polymerization is carried out in a medium which comprises, in addition to the mixture of monomers and the initiator, at least one substance selected from the group consisting of: activators in an amount of from 0.001 to about 5% by weight on the total monomers weight; accelerants in an amount of from 0.001 to about 5% by weight on the total monomers weight; buffering agents in an amount sufficent to maintain the pH of the polymerization reaction mass substantially constant; and dispersing agents in an amount to insure dispersion of the reagents in the polymerization reaction mass.

11. The process according to claim 7, further characterized in that the polymerization is carried out in a medium which comprises, in addition to the mixed monomers and the initiator, chain transfer agents for regulating the molecular weight of the terpolymerizate and present in an amount of from 0.001 to 10% by weight on the total monomers weight.

12. The process according to claim 11, further characterized in that the chain transfer agents are present in an amount of from 0.01 to 2% by weight on the total monomers weight.

References Cited

UNITED STATES PATENTS

| | | | |
|---|---|---|---|
| 2,979,490 | 4/1961 | West | 260—87.5 |
| 3,011,995 | 12/1961 | Smith | 260—80.5 |
| 3,051,677 | 8/1962 | Rexford | 260—29.6 |
| 3,080,336 | 3/1963 | Smith | 260—80.5 |

MURRAY TILLMAN, *Primary Examiner.*

J. L. WHITE, *Assistant Examiner.*